United States Patent
See Tho (10) Patent No.: US 12,234,046 B2
(45) Date of Patent: Feb. 25, 2025

(54) METHODS OF MAKING AND TRANSPORTING FROZEN FOOD COMPOSITIONS AND RE-USING COMPONENTS UTILIZED THEREIN

(71) Applicant: SOCIETE DES PRODUITS NESTLE S.A., Vevey (CH)

(72) Inventor: Tommy See Tho, Selangor Darul Ehsan (MY)

(73) Assignee: SOCIETE DES PRODUITS NESTLE S.A., Vevey (CH)

( * ) Notice: Subject to any disclaimer, the term of this patent is extended or adjusted under 35 U.S.C. 154(b) by 302 days.

(21) Appl. No.: 17/283,715

(22) PCT Filed: Oct. 11, 2019

(86) PCT No.: PCT/EP2019/077555
§ 371 (c)(1),
(2) Date: Apr. 8, 2021

(87) PCT Pub. No.: WO2020/074682
PCT Pub. Date: Apr. 16, 2020

(65) Prior Publication Data
US 2021/0323702 A1     Oct. 21, 2021

Related U.S. Application Data

(60) Provisional application No. 62/744,894, filed on Oct. 12, 2018.

(51) Int. Cl.
*B65B 25/00*     (2006.01)
*A23G 9/08*      (2006.01)
(Continued)

(52) U.S. Cl.
CPC .............. *B65B 25/007* (2013.01); *A23G 9/08* (2013.01); *A23G 9/28* (2013.01); *A23G 9/30* (2013.01);
(Continued)

(58) Field of Classification Search
CPC ..... B65B 25/007; B65B 61/26; B65B 25/005; B65B 25/001; B65B 63/005; A23G 9/08;
(Continued)

(56) References Cited

U.S. PATENT DOCUMENTS 411,368 A * 9/1889 Barnhart
689,093 A * 12/1901 Kestenbaum
(Continued)

FOREIGN PATENT DOCUMENTS

DE     20312469     11/2003
GB       340889      1/1931

OTHER PUBLICATIONS

Translation of SG 124321A1 (Year: 2006).*
Translation of EP 0686437A2 (Year: 1995).*

*Primary Examiner* — Drew E Becker
(74) *Attorney, Agent, or Firm* — K&L Gates LLP (57) ABSTRACT

A method of transporting one or more frozen food compositions can include providing a first container; dispensing at least one comestible ingredient into the first container, the dispensing of the at least one comestible ingredient into the first container is performed at a first location; positioning a first lid on the first container containing the at least one comestible ingredient; freezing the first container with the first lid thereon and the at least one comestible ingredient therein to form a first frozen food composition in the first container; attaching a first jacket to at least one of (a) the first container with the first frozen food composition therein or (b) the first lid on the first container with the first frozen food (Continued)

composition therein; and transporting the first frozen food composition to a second location by transporting the first container in the first jacket to the second location.

11 Claims, 2 Drawing Sheets

(51) Int. Cl.
    *A23G 9/28*     (2006.01)
    *A23G 9/30*     (2006.01)
    *B65B 61/26*     (2006.01)
    *B65D 81/38*     (2006.01)
    *G06K 1/12*     (2006.01)

(52) U.S. Cl.
    CPC .......... *B65B 61/26* (2013.01); *B65D 81/3865* (2013.01); *B65D 81/3876* (2013.01); *G06K 1/121* (2013.01)

(58) Field of Classification Search
    CPC ........ A23G 9/28; A23G 9/30; B65D 81/3865; B65D 81/3876; B65D 85/60; B65D 85/78; G06K 1/121; G06Q 10/08; G06Q 50/28; G06Q 10/0832
    See application file for complete search history.

(56) References Cited

U.S. PATENT DOCUMENTS

| | | | | |
|---|---|---|---|---|
| 1,584,610 A * | 5/1926 | Christians | ............ | A01D 87/121 280/79.11 |
| 1,654,135 A * | 12/1927 | Mauck | .................... | B65D 7/36 413/8 |
| 1,756,039 A * | 4/1930 | Staake | ............... | B65D 77/0486 220/592.14 |
| 1,868,773 A * | 7/1932 | Staake | ............... | B65D 77/0486 220/592.15 |
| 1,871,153 A * | 8/1932 | Buchanan | .............. | B65D 85/78 383/110 |
| 1,877,290 A * | 9/1932 | Forrest | ................ | A47J 41/0077 220/592.2 |
| 1,895,278 A * | 1/1933 | Crawford | ........... | B65D 81/3897 383/110 |
| 2,001,478 A * | 5/1935 | Vogt | ........................ | B65D 5/18 426/123 |
| 2,052,726 A * | 9/1936 | Schleier | ................. | B65D 85/78 220/23.91 |
| 2,199,037 A * | 4/1940 | Borden | ...................... | G09F 3/04 40/310 |
| 2,632,311 A * | 3/1953 | Sullivan | .................. | F25D 3/125 220/62.13 |
| 3,344,974 A * | 10/1967 | Bostrom | .............. | B65D 51/185 D9/425 |
| 3,383,009 A * | 5/1968 | Weikert | ................ | F25D 25/005 206/508 |
| 3,468,369 A * | 9/1969 | Reed | ....................... | F25B 41/40 165/104.31 |
| 3,866,818 A * | 2/1975 | Smith | .................... | B65D 71/10 206/427 |
| 6,103,287 A * | 8/2000 | Soehnlen | ........... | B65D 21/0219 426/524 |
| 6,196,406 B1 * | 3/2001 | Ennis | .................... | B65D 71/02 220/735 |
| 6,332,334 B1 * | 12/2001 | Faryabi | ................ | B65D 21/064 62/457.2 |
| 6,536,189 B1 * | 3/2003 | Murray | .................. | B65B 25/001 53/472 |
| 6,928,415 B1 * | 8/2005 | Liberman | .............. | G06Q 10/08 705/15 |
| 11,292,655 B1 * | 4/2022 | Fisher | ................ | B65D 21/0233 |
| 2002/0004749 A1 * | 1/2002 | Froseth | .................. | G06Q 50/00 705/16 |
| 2003/0003249 A1 * | 1/2003 | Benim | .............. | B65D 81/3886 156/251 |
| 2004/0142070 A1 * | 7/2004 | Haen | ...................... | G01K 3/005 426/87 |
| 2005/0029149 A1 * | 2/2005 | Leung | ................ | B65D 81/2023 206/524.8 |
| 2005/0067106 A1 * | 3/2005 | Melges | .................. | B41J 3/4075 156/367 |
| 2005/0103804 A1 * | 5/2005 | Waters | ................ | B67D 3/0029 222/129 |
| 2005/0217304 A1 * | 10/2005 | Sekiyama | .......... | B65D 81/3816 62/371 |
| 2007/0082096 A1 * | 4/2007 | Dougherty | .............. | B65B 55/02 426/412 |
| 2007/0150373 A1 * | 6/2007 | Kuo | ...................... | G06Q 10/087 705/28 |
| 2007/0157653 A1 * | 7/2007 | Sasaki | ................ | B65D 81/3818 62/457.7 |
| 2007/0180850 A1 | 8/2007 | Thompson | | |
| 2008/0052202 A1 * | 2/2008 | Bodin | .................. | G06Q 10/087 705/28 |
| 2008/0078824 A1 * | 4/2008 | Spriegel | ............ | B65D 81/3876 206/459.5 |
| 2008/0092584 A1 | 4/2008 | Coppin | | |
| 2010/0102057 A1 * | 4/2010 | Long | ..................... | A01N 1/0263 206/503 |
| 2010/0122928 A1 * | 5/2010 | Davis | ................. | B65D 81/3876 206/457 |
| 2011/0111101 A1 * | 5/2011 | Yourist | ............... | B01F 35/3202 426/232 |
| 2012/0305634 A1 * | 12/2012 | VonAlst | ................. | B65D 85/36 229/146 |
| 2014/0319302 A1 * | 10/2014 | Baltz | .................. | B65D 19/385 248/346.02 |
| 2016/0088960 A1 * | 3/2016 | Liang | ................. | A47G 19/2288 220/560.01 |
| 2016/0284153 A1 * | 9/2016 | Tansey, Jr. | ................ | B65B 3/04 |
| 2017/0024691 A1 * | 1/2017 | O'Brien | ............ | G06Q 10/0832 |
| 2017/0297805 A1 * | 10/2017 | Yaguchi | ................ | A47J 39/00 |
| 2018/0111719 A1 * | 4/2018 | Nunez | .................. | A23G 9/52 |
| 2018/0130015 A1 * | 5/2018 | Jones | .................. | G06Q 10/083 |
| 2018/0257850 A1 * | 9/2018 | Bastian | ................ | A23G 9/503 |
| 2019/0077560 A1 * | 3/2019 | Witt | ...................... | B65D 61/02 |
| 2019/0251522 A1 * | 8/2019 | Wallis | ............... | G06Q 30/0633 |
| 2019/0315527 A1 * | 10/2019 | Saylor | .................... | A47G 19/32 |
| 2021/0224735 A1 * | 7/2021 | Rehn | ................ | G06Q 10/0832 |
| 2021/0241238 A1 * | 8/2021 | Sperry | .................... | G06Q 10/30 |
| 2021/0327012 A1 * | 10/2021 | Issing | .................... | G05B 15/02 |
| 2021/0387789 A1 * | 12/2021 | See Tho | .................... | B65D 85/78 |
| 2022/0019965 A1 * | 1/2022 | Choi | ................ | G06Q 10/0833 |
| 2023/0085105 A1 * | 3/2023 | Edwards | ............. | G06Q 10/087 700/214 |

* cited by examiner

FIG. 1

METHODS OF MAKING AND TRANSPORTING FROZEN FOOD COMPOSITIONS AND RE-USING COMPONENTS UTILIZED THEREIN

CROSS REFERENCE TO RELATED APPLICATIONS

The present application is a National Stage of International Application No. PCT/EP2019/077555, filed on Oct. 11, 2019, which claims priority to U.S. Provisional Patent Application No. 62/744,894, filed on Oct. 12, 2018, the entire contents of which are being incorporated herein by reference.

BACKGROUND

The present disclosure generally relates to frozen food compositions such as frozen confections. More specifically, the present disclosure relates to methods of making and transporting frozen food compositions and re-using components utilized therein.

SUMMARY

The present inventors developed methods in which one or more food containers, jackets for the food containers, or lids for the containers and/or the jackets can be re-used. For example, a food composition made at a factory can be provided in a first delivery to a consumer, and then after the first delivery, one or more of the corresponding articles (e.g., the container, the jacket and/or the lid) can be collected, washed and re-used (e.g., re-filled with another food composition). Preferably the containers and the lids can be washed at an intermediate location (e.g., a distribution center) and then returned to the factory where they are re-filled, and the jackets can be cleaned at the intermediate location and kept at the intermediate location so that the jackets can be positioned onto the re-filled containers. The container and/or the jacket are preferably made from an insulating material, e.g., a metal such as stainless steel, and preferably at least a portion of the lid is an insulating material, e.g., a metal such as stainless steel.

Accordingly, in an embodiment, the present disclosure provides a method of transporting one or more frozen food compositions. The method comprises: providing a first container; dispensing at least one comestible ingredient into the first container, the dispensing of the at least one comestible ingredient into the first container is performed at a first location; positioning a first lid on the first container containing the at least one comestible ingredient; freezing the first container with the first lid thereon and the at least one comestible ingredient therein to form a first frozen food composition in the first container; attaching a first jacket to at least one of (a) the first container with the first frozen food composition therein or (b) the first lid on the first container with the first frozen food composition therein; and transporting the first frozen food composition to a second location different than the first location by transporting the first container in the first jacket to the second location.

In an embodiment, each of the one or more food compositions is a frozen confection.

In an embodiment, at least one of the first container, the first lid or the first jacket comprises an insulating material, such as a metal, a plastic, a ceramic or a combination thereof, preferably stainless steel.

In an embodiment, at least one of the first container or the first frozen food composition is substantially or completely enclosed by a combination of the first lid, the first jacket, and optionally an intermediate component connecting the first lid to the first jacket.

In an embodiment, the dispensing of the at least one comestible ingredient, the positioning of the first lid on the first container, and the freezing of the at least one comestible ingredient in the first container are performed at the first location. The method can further comprise printing at least one of a batch code or an expiry date on the first lid at the first location after the first lid is applied to the first container.

In an embodiment, the method further comprises transporting the first container with the first frozen food composition therein from the first location to an intermediate location, wherein the attaching of the first jacket is performed at the intermediate location, and the transporting of the first frozen food composition to the second location comprises transporting the first container in the first jacket from the intermediate location to the second location.

In an embodiment, the method further comprises performing product testing in parallel with the transporting of the first container holding the first frozen food composition from the first location to the intermediate location.

In an embodiment, the transporting of the first container with the first frozen food composition therein from the first location to the intermediate location comprises loading one or more packs on a pallet carried by a vehicle, each of the one or more packs containing a plurality of frozen food compositions in a corresponding plurality of containers with a corresponding plurality of lids.

In an embodiment, the intermediate location is a distribution center at which a plurality of containers holding a plurality of frozen food compositions is received by a corresponding plurality of jackets.

In an embodiment, the method further comprises: cleaning the first jacket after the first frozen food composition has been removed from the first container, the cleaning is performed at a different location than the second location; and then attaching the cleaned first jacket to a component at the intermediate location, the component selected from the group consisting of (a) a second container with a second frozen food composition therein, (b) a second lid on a second container with a second frozen food composition therein, (c) a second lid on the first container with a second frozen food composition therein after the first container has been cleaned, (d) the first lid on a second container with a second frozen food composition therein after the first lid has been cleaned, and (e) the first lid on the first container with a second frozen food composition therein after the first lid and the first container have been cleaned.

In an embodiment, the method further comprises: cleaning the first container after the first frozen food composition has been removed from the first container, the cleaning is performed at a different location than the second location; transporting the cleaned first container with a second frozen food composition therein from the first location to the intermediate location; and then attaching a component to the cleaned first container with the second frozen food composition therein at the intermediate location, the component selected from the group consisting of (a) a second jacket, (b) a second lid, (c) a second lid and a second jacket, (d) the first lid after the first lid has been cleaned, (e) the first jacket after the first jacket has been cleaned, and (f) the first lid and the first jacket after the first lid and the first jacket have been cleaned.

In an embodiment, the method further comprises: cleaning the first lid after the first frozen food composition has been removed from the first container, the cleaning is performed at a different location than the second location; transporting the cleaned first lid from the first location to the intermediate location, the cleaned first lid is transported to the intermediate location while covering a second frozen food composition in either the first container after the first container has been cleaned or a second container; and then attaching a component to the cleaned first lid covering the second frozen food composition at the intermediate location, the component selected from the group consisting of (a) a second jacket, (b) a second container, (c) a second lid and a second container, (d) the first container after the first container has been cleaned, (e) the first jacket after the first jacket has been cleaned, and (f) the first container and the first jacket after the first container and the first jacket have been cleaned.

In an embodiment, the second frozen food composition was prepared at the first location subsequently to the first frozen food composition.

In an embodiment, the method further comprises positioning the first jacket holding the first container in an insulated tote at the intermediate location, wherein the first frozen food composition is transported to the second location in the insulated tote. The method can further comprise positioning one or more additional containers in the insulated tote at the intermediate location, wherein the first frozen food composition and one or more additional frozen food compositions in the one or more additional containers are transported together to the second location in the insulated tote. The method can further comprise removing the first container holding the first frozen food composition from the insulated tote at the second location and then transporting at least one of the one or more additional frozen food compositions from the second location to a third location in the insulated tote.

In an embodiment, the first location comprises a filling line on which the dispensing of the at least one comestible ingredient is performed for a plurality of containers, the plurality of containers receive a corresponding plurality of lids on the filling line, and then the plurality of containers are frozen in a freezing unit at the first location to form a plurality of frozen food compositions.

In an embodiment, the plurality of lids comprises a first subset of lids having a first color that identifies a first flavor of a first subset of the plurality of frozen food compositions, and the plurality of lids further comprises a second subset of lids having a second color that identifies a second flavor of a second subset of the plurality of frozen food compositions, the first color is a different color than the second color, and the first flavor is a different flavor than the second flavor.

In an embodiment, the attaching of the first jacket comprises at least one step selected from the group consisting of (i) receiving a portion of the first lid in a complementary portion of the first jacket and (ii) receiving a portion of the first jacket in a complementary portion of the first lid.

In an embodiment, the second location is a home of a consumer.

In another embodiment, the present disclosure provides a method of providing a frozen food composition directly to a consumer. The method comprises: providing a container; dispensing at least one comestible ingredient into the container; positioning a lid on the container containing the at least one comestible ingredient; freezing the container with the lid thereon and the at least one comestible ingredient therein to form the frozen food composition in the container, wherein at least one step is performed at a first location and is selected from the group consisting of (i) the dispensing of the at least one comestible ingredient, (ii) the positioning the lid on the container, and (iii) the freezing of the container; transporting the container with the frozen food composition therein from the first location to an intermediate location; attaching a jacket to at least one of (a) the container with the frozen food composition therein or (b) the lid on the container with the frozen food composition therein, the attaching of the jacket is performed at the intermediate location; and transporting the frozen food composition from the intermediate location to a home of the consumer by transporting the container in the jacket to the home of the consumer.

An advantage of one or more embodiments provided by the present disclosure is to clean and reuse a container for a frozen food composition such as a frozen confection.

Another advantage of one or more embodiments provided by the present disclosure is to provide a consumer with a frozen food composition at their home without the need to visit a grocery store or other retail establishment away from the home.

Yet another advantage of one or more embodiments provided by the present disclosure is to perform shipping while re-using one or more components such that solid waste is minimized.

Still another advantage of one or more embodiments provided by the present disclosure is convenience for the consumer.

Yet another advantage of one or more embodiments provided by the present disclosure is a container that allows a freezing of a food product therein before a jacket is attached, to thereby provide a faster and more efficient freezing both in the factory and during the first part of the transportation thereof.

Moreover, another advantage of one or more embodiments provided by the present disclosure is a container carried inside an insulated tote that preserve the organoleptic qualities of a frozen food composition within the container even if the insulated tote is subjected to ambient conditions (e.g., ambient temperature) for up to 24 hours, and in some embodiments at ambient conditions even for 32-34 hours.

Additional features and advantages are described herein and will be apparent from the following Figures and Detailed Description.

DETAILED DESCRIPTION

Definitions

Some definitions are provided hereafter. Nevertheless, definitions may be located in the "Embodiments" section below, and the above header "Definitions" does not mean that such disclosures in the "Embodiments" section are not definitions.

As used in this disclosure and the appended claims, the singular forms "a," "an" and "the" include plural referents unless the context clearly dictates otherwise. Thus, for example, reference to "an ingredient" or "the ingredient" includes two or more ingredients.

The words "comprise," "comprises" and "comprising" are to be interpreted inclusively rather than exclusively. Likewise, the terms "include," "including" and "or" should all be construed to be inclusive, unless such a construction is clearly prohibited from the context. Nevertheless, the compositions disclosed herein may lack any element that is not specifically disclosed herein. Thus, a disclosure of an embodiment using the term "comprising" includes a disclosure of embodiments "consisting essentially of" and "consisting of" the components identified.

The term "and/or" used in the context of "X and/or Y" should be interpreted as "X," or "Y," or "X and Y." Where used herein, the terms "example" and "such as," particularly when followed by a listing of terms, are merely exemplary and illustrative and should not be deemed to be exclusive or comprehensive.

The term "food composition" means a composition that is intended for ingestion by an individual, such as a human or a companion animal, and provides at least one nutrient to the individual. The term "frozen confection" refers to any frozen or chilled confection. Non-limiting examples are ice cream, sorbet, sherbet, water ice, frozen yogurt, frozen dairy, soft ice, granitas, Mellorine, frozen custard, non-dairy frozen confection, milk ice, ice lolly, gelato or frozen jelly, or chilled desserts such as mousses, whipped yogurt, milk shakes or smoothie or coffee latté.

As used herein, a "location" is a particular address or a particular building. A "different" location is thus a different address or a different building, preferably at least one mile apart, more preferably at least two miles apart, even more preferably at least three miles apart, most preferably at least five miles apart. Consequently, different areas of the same building are not considered "different locations" in the present disclosure.

Embodiments

Figure 1:
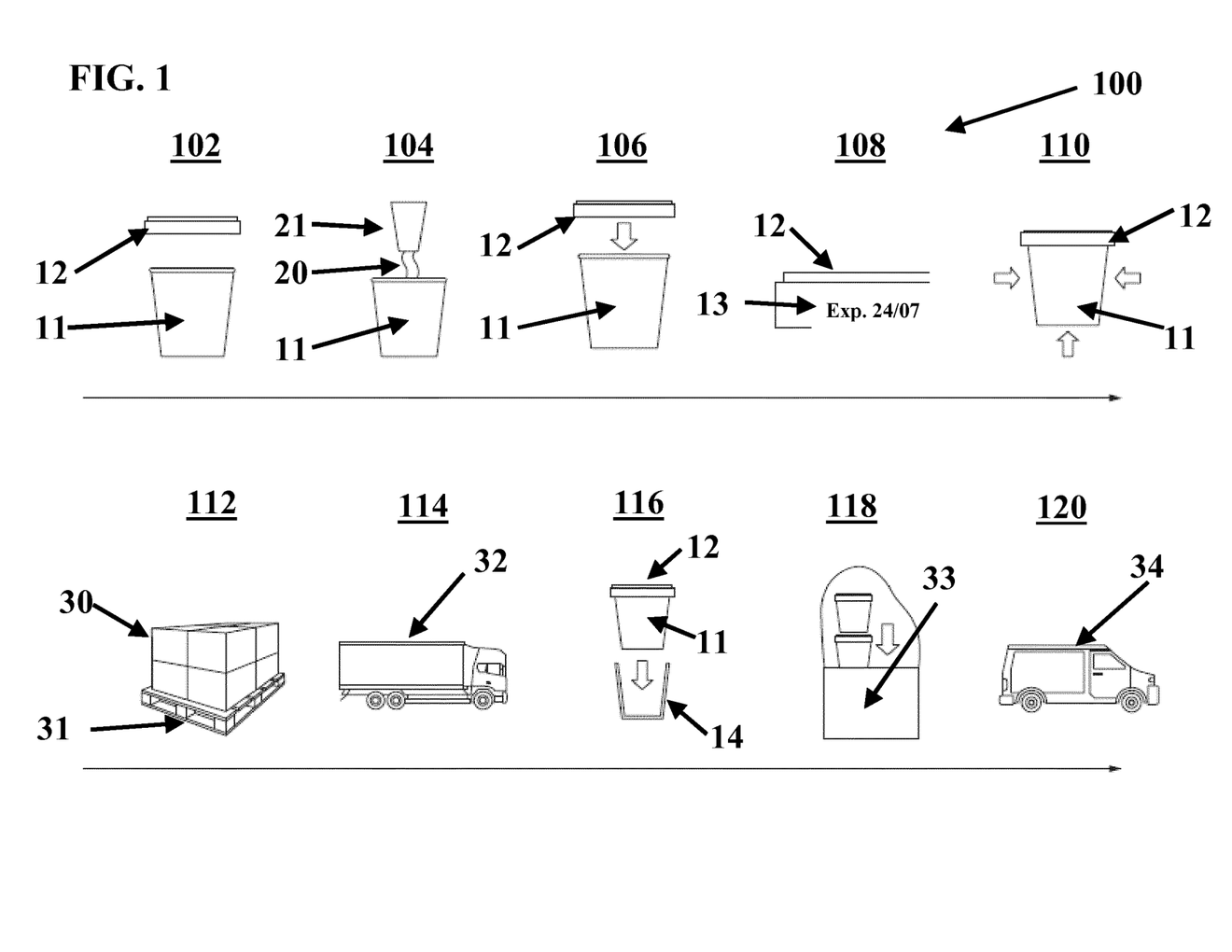
FIGS. 1 and 2 are a flowchart showing a non-limiting example of a method according to the present disclosure.
Figure 2:
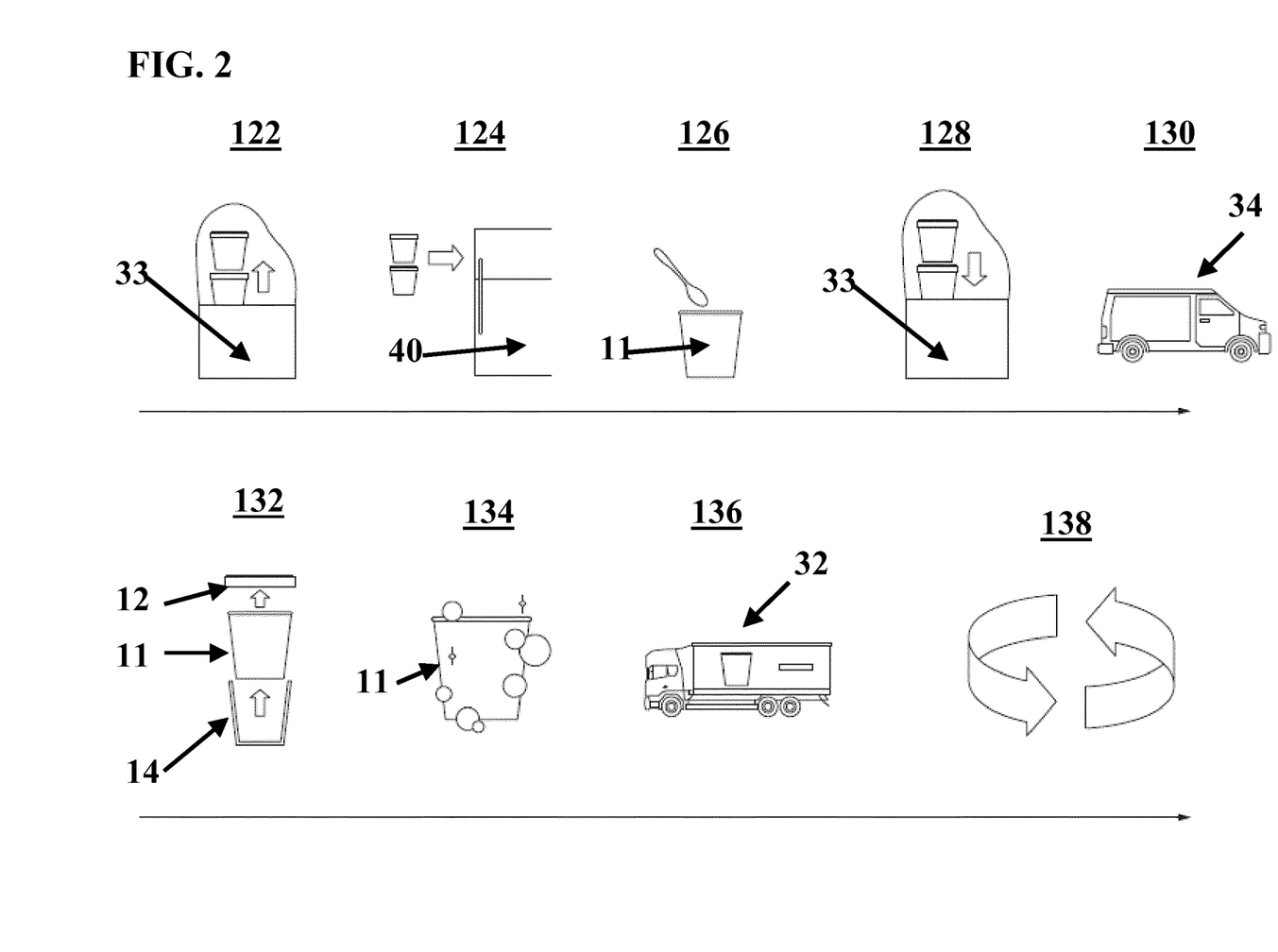

An aspect of the present disclosure is a method of transporting one or more frozen food compositions. A non-limiting example of a method 100 is generally illustrated in FIGS. 1 and 2. However, some embodiments of the method 100 can omit one or more of the steps depicted in these figures, and some embodiments of the method 100 can include one or more additional steps. The depicted steps are preferably performed in the order in which they are illustrated (as shown by arrows), but some embodiments can perform the steps in a different order. Indeed, the present disclosure is not limited to the specific embodiment shown in FIGS. 1 and 2.

The method 100 can comprise providing a first container 11 and/or a first lid 12 (Step 102). Preferably the first container 11 is provided as part of a plurality of containers, and preferably the first lid 12 is provided as part of a plurality of containers. In an embodiment, each of the plurality of containers (e.g., the first container 11) and/or each of the plurality of lids (e.g., the first lid 12) comprise at least portion thereof that is made of an insulating material such as a metal, a plastic, a ceramic, or a combination thereof, for example stainless steel (e.g., one or more parts of the lid are one or more insulating materials). Preferably the entirety of each container (e.g., the first container 11) is made of one or more insulating materials.

In an embodiment, each of the plurality of containers (e.g., the first container 11) and each of the plurality of lids (e.g., the first lid 12) has a circular cross-section, such as a circular opening of the container and/or a circular bottom surface of the container, but the present disclosure is not limited to a specific shape of the container or the lid.

The method 100 can comprise dispensing at least one comestible ingredient 20 into the first container 11, preferably from one or more nozzles 21 (Step 104). The first container 11 can be provided as part of a plurality of containers, and preferably the at least one comestible ingredient 20 is dispensed into each of the plurality of containers. The present disclosure is not limited to a specific embodiment of the at least one comestible ingredient 20, and the at least one comestible ingredient 20 can be any material suitable for oral ingestion by an individual such as a human or a companion animal.

Then the method 100 can comprise positioning the first lid 12 on the first container 11 containing the at least one comestible ingredient 20 (Step 106). The first container 11 can be provided as part of a plurality of containers, and preferably each of a plurality of lids are positioned onto a corresponding container from the plurality of containers.

In an embodiment, Step 104—the dispensing of the at least one comestible ingredient 20 into the first container 11, e.g., dispensing the at least one comestible ingredient into each of the plurality of containers—and Step 106—the positioning of the first lid 12 on the first container 11, e.g., each of a plurality of lids are positioned onto a corresponding container from the plurality of containers—are both performed at the same location, i.e., a first location. For example, Steps 104 and 106 can both be performed at a first location that is a factory comprising a filling line on which the dispensing of the at least one comestible ingredient 20 is performed for a plurality of containers and on which the plurality of containers subsequently receive a corresponding plurality of lids.

Optionally, the method 100 can comprise printing indicia on at least one of the first lid 12 and/or the first container 11 containing the at least one comestible ingredient 20; the indicia can comprise at least one of a batch code or an expiry date (Step 108). The first lid 12 can be provided as part of a plurality of lids, and preferably the indicia is printed onto each of the plurality of lids, optionally after the lids are applied to the containers. The indicia can be printed onto the plurality of lids at the first location, for example by a printing device on the filling line.

After the first lid 12 has been positioned on the first container 11 with the at least one comestible ingredient 20 therein, the method 100 can comprise freezing the first container 11 with the first lid 12 thereon and the at least one comestible ingredient 20 therein to form a first frozen food composition in the first container 11 (Step 110). In an embodiment, the first frozen food composition is a frozen confection. In embodiments utilizing a plurality of containers, the plurality of containers can be frozen to form a plurality of frozen food compositions, e.g., a plurality of frozen confections. For example, the factory can comprise a freezing unit to which the plurality of containers can be subjected while on the filling line or to which the plurality of container can be taken after the filling line.

As a result, the first container 11 can advantageously allow a freezing of the one or more comestible ingredients 20 into the frozen food composition in the first container 11 before a jacket is attached to the first container 11 (discussed in more detail later herein). Such a process can provide a faster and more efficient freezing both in the factory and during the first part of the transportation thereof.

Then the method 100 can comprise packaging the plurality of containers holding the frozen food compositions with the lids thereon (e.g., the first container 11 with the first frozen food composition therein and the first lid 12 thereon) into larger containers, such as shipping boxes (Step 112). For example, one or more packs 30 can each hold a plurality of containers holding frozen food compositions. The one or more packs 30 can be loaded onto a pallet 31 for transport. The packaging of the plurality of containers holding frozen food compositions with the lids thereon can be performed at the first location, for example at a shipping area of the factory.

Then the method 100 can comprise transporting the plurality of containers holding the frozen food compositions with the lids thereon (e.g., the first container 11 with the first frozen food composition therein and the first lid 12 thereon) from the first location, such as a factory, to an intermediate location that is a different location than the first location, such as a distribution center (Step 114). For example, the one or more packs 30 (e.g., on the pallet 31) can be transported from the first location to the intermediate location. In an embodiment, a first motorized vehicle 32 such as a freight truck is used to transport the plurality of containers holding frozen food compositions with the lids thereon from the first location to the intermediate location.

In an embodiment, the method 100 further comprises performing product testing in parallel with the packaging of the plurality of containers into the one or more packs 30 (Step 112) and/or the transporting of the first container 11 holding the first frozen food composition from the first location to the intermediate location (Step 114).

Then the method 100 can comprise positioning a first jacket 14 on the first container 11 with the first frozen food composition therein and the first lid 12 thereon, preferably at the intermediate location (Step 116). In an embodiment, the first jacket 14 can attach to the first container 11 such that a relative position of the first container 11 in the first jacket 14 is maintained. For example, the first jacket 14 can reversibly attach to at least one of (a) the first container 11 with the first frozen food composition therein or (b) the first lid 12 on the first container 11 with the first frozen food composition therein. As used herein, "reversibly" attached means that the referenced components can be connected and disconnected from each other without damaging any of these components and without damaging a connector, if any, and preferably without requiring any tools.

As a particular non-limiting example, the first jacket 14 (or an intermediate part connected thereto) can comprise threads complementary to threads on the first container 11 (or an intermediate part connected thereto) for reversible attachment between the first jacket 14 and the first lid 12. Additionally or alternatively, the first jacket 14 (or an intermediate part connected thereto) can comprise threads complementary to threads on the first lid 12 (or an intermediate part connected thereto) for reversible attachment. However, the present disclosure is not limited to a specific embodiment of reversibly attaching the first jacket 14 to at least one of the first container 11 or the first lid 12, and the first jacket 14 can be reversibly attached to at least one of the first container 11 or the first lid 12 by any means known to one skilled in this art.

In an embodiment, at least one of the first container 11 or the first frozen food composition therein is substantially or completely enclosed by a combination of the first lid 12, the first jacket 14, and optionally an intermediate component connecting the first lid 12 to the first jacket 14. As used herein, "substantially enclosed" means at least 75% of the outermost surfaces are enclosed, preferably at least 80% of the outermost surfaces are enclosed, more preferably at least 85% of the outermost surfaces are enclosed, even more preferably at least 90% of the outermost surfaces are enclosed, most preferably at least 95% of the outermost surfaces are enclosed.

In an embodiment, the intermediate location is a distribution center at which a plurality of containers holding a plurality of frozen food compositions is received, and each of a plurality of jackets is positioned on and/or attached to a corresponding container with a corresponding lid thereon. In an embodiment, each of the plurality of jackets (e.g., the first jacket 14) comprise at least portion thereof that is made of an insulating material such as a metal, a plastic, a ceramic, or a combination thereof, for example stainless steel (e.g., one or more parts of the lid are one or more insulating materials). Preferably the entirety of each jacket (e.g., the first jacket 14) is made of one or more insulating materials.

The method 100 can comprise positioning the plurality of jackets (e.g., the first jacket 14) holding the plurality of containers (e.g., the first container 11) in an insulated tote 33, preferably at the intermediate location (Step 118). The insulated tote 33 can comprise a bag into which one or more insulated plates are inserted, such as a bottom insulated plate and/or one or more side insulated plates. In an embodiment, the insulated tote 33 can have a height up to nine inches and/or a width up to six inches.

The method 100 can comprise transporting the first container 11 with the first frozen food composition therein and the first lid 12 and the first jacket 14 thereon from the intermediate location to a second location, that is a different location than the first and intermediate locations, for example a home of a consumer (Step 120). For example, the first container 11 can be transported from the intermediate location to the second location in the insulated tote 33 as part of a plurality of containers with a plurality of frozen food compositions therein and a plurality of lids and a plurality of jackets thereon.

In some embodiments, the first container 11 carried inside the insulated tote 33 can preserve the organoleptic qualities of a frozen food composition even if the insulated tote 33 is subjected to ambient conditions (e.g., ambient temperature) for up to 24 hours, and in some embodiments at ambient conditions even for 32-34 hours.

In an embodiment, a second motorized vehicle 34, such as a delivery van, transports the first container 11 with the first frozen food composition therein and the first lid 12 and the first jacket 14 thereon from the intermediate location to the second location, e.g., in the insulated tote 33. The insulated tote 33 can be transported in a larger bag, for example a bag that additionally contains other food items such as non-frozen food items. In an embodiment, the transporting of the plurality of containers (e.g., the first container 11) with a plurality of frozen food compositions therein and a plurality of lids (e.g., the first lid 12) and a plurality of jackets thereon (e.g., the first jacket 14) from the intermediate location to the second location occurs over a time period less than twenty-four hours.

The method 100 can comprise removing the first container 11 holding the first frozen food composition from the insulated tote 33 at the second location, e.g., the home of the consumer (Step 122). For example, one or more containers, including the first container 11, can be removed from the insulated tote 33 at the second location. The one or more containers are preferably removed from the insulated tote 33 with the corresponding one or more jackets and the corresponding one or more lids thereon (e.g., the first jacket 14 and the first lid 12). The one or more containers, including the first container 11, can be removed from the insulated tote 33 by a delivery person operating the second motorized vehicle 34 or the consumer at their home.

In an embodiment, any containers holding frozen food compositions that remain in the insulated tote 33 after the second location can then be transported to one or more third locations. For example, after removal of the first container 11 holding the first frozen food composition from the insulated tote 33, one or more additional frozen food compositions can be transported from the second location to one or more third locations in the insulated tote 33.

The method 100 can comprise placing the one or more containers removed from the insulated tote 33 at the second location into a refrigerator or freezer 40 at the second location (Step 124). For example, after removal from the insulated tote 33, the first container 11 with the first frozen food composition therein and the first lid 12 and the first jacket 14 thereon can be placed into the refrigerator or freezer 40.

The method 100 can comprise the consumer consuming at least a portion of the first frozen food composition from the first container 11, for example at the second location (Step 126). Consumption of the first frozen food composition can be preceded by removal of the first container 11 from the refrigerator or freezer 40 and removal of the first lid 12 from the first container 11 (e.g., rotating the first lid 12 relative to the first container 11 to disengage complementary threads thereon). Preferably the first frozen food composition can be consumed from the first container 11 with the first jacket 14 still on the first container 11. For example, the first jacket 14 can tightly hold the first container 11 so that the first container 11 does not move relative to the first jacket 14 as the first frozen food composition is consumed, e.g., scooped by a spoon.

The method 100 can comprise placing the first container 11 back in the insulated tote 33, for example after at least a portion of the first food composition has been consumed (Step 128). Preferably the first container 11 is placed back in the insulated tote 33 with the first lid 12 and the first jacket 14 thereon. If a plurality of containers were removed at the second location, the plurality of containers can be placed back in the insulated tote 33 at the second location after at least a portion of each corresponding frozen food composition has been consumed (e.g., partially empty or completely empty container), preferably with the corresponding jackets and the corresponding lids thereon. If one or more containers were removed from the insulated tote 33 at one or more third locations, these one or more containers can be placed back in the insulated tote 33 at the one or more third locations before and/or after the first container is placed back in the insulated tote 33, preferably with the corresponding jackets and the corresponding lids thereon and at least a portion of the corresponding frozen food composition consumed (e.g., partially empty or completely empty container).

The method 100 can comprise transporting the first container 11 with at least a portion of the first frozen food composition consumed (e.g., partially empty or completely empty container) and the first lid 12 and the first jacket 14 thereon from the second location back to the intermediate location (Step 130). For example, the first container 11 can be transported to the intermediate location from the second location in the insulated tote 33 as part of a plurality of containers with at least a portion of the corresponding frozen food compositions consumed (e.g., partially empty or completely empty container) and a plurality of lids and a plurality of jackets thereon.

In an embodiment, the second motorized vehicle 34, such as a delivery van, transports the first container 11 with at least a portion of the first frozen food composition consumed (e.g., partially empty or completely empty container) and the first lid 12 and the first jacket 14 thereon to the intermediate location from the second location, e.g., in the insulated tote 33.

The method 100 can comprise separating the first jacket 14, the first container 11 and the first lid 12 from each other at the intermediate location, e.g., the distribution center (Step 132). The separating step can be preceded by removing the first container 11 holding the first frozen food composition from the insulated tote 33 at the intermediate location. For example, one or more containers, including the first container 11, can be removed from the insulated tote 33 at the second location. The one or more containers are preferably removed from the insulated tote 33 with the corresponding one or more jackets and the corresponding one or more lids thereon (e.g., the first jacket 14 and the first lid 12). Then each container can be separated from the corresponding jacket and the corresponding lid.

The method 100 can comprise washing the first container 11, the first lid 12 and the first jacket 14 that have been separated from each other, and preferably the washing is performed at the intermediate location, e.g., the distribution center (Step 134). Preferably the first container 11, the first lid 12 and the first jacket 14 are constructed such that they do not retain water after the washing. As a non-limiting example, the washing can comprise ultra-sonic cleaning such as a pH 12 ultra-sonic bath; and the first container 11, the first lid 12 and the first jacket 14 can comprise or consist of materials that can withstand such washing. However, the present disclosure is not limited to a specific embodiment of the washing, and the washing can be any means known in the art that reduces the residual material on the components.

The method 100 can comprise transporting the cleaned first container 11 and the cleaned first lid 12 from the intermediate location (e.g., the distribution center) to the first location (e.g., the factory), preferably while the cleaned first jacket 14 is kept at the intermediate location (Step 136). For example, the cleaned first container 11 can be transported from the intermediate location to the first location as part of a plurality of cleaned containers, and the cleaned first lid 12 can be transported from the intermediate location to the first location as part of a plurality of cleaned lids.

In an embodiment, the containers have a tapered structure such that the diameter is larger at the opening than at the bottom surface to thereby facilitate stacking of the containers during the transporting and thus maximize the number of containers that can fit in a given space. The transporting can be performed by the first motorized vehicle 32 such as a freight truck.

The method 100 can comprise re-using the cleaned components such as the cleaned containers, the cleaned lids and the cleaned jackets (e.g., the cleaned first container 11, the cleaned first lid 12 and the cleaned first jacket 14) (Step 138). In this regard, any of the preceding steps can be performed again, but using one or more of the cleaned components. For example, a cleaned container can receive a new dispensing of the one or more comestible ingredients, then a cleaned lid can close the container (not necessarily the same lid as previously utilized on the cleaned container), then freezing thereof can form a new frozen food composition in the container, then transporting of the container to the intermediate location can allow a cleaned jacket to be applied (not necessarily the same jacket as previously utilized on the cleaned container, not necessarily the same jacket as previously utilized with the cleaned lid, and not necessarily the same intermediate location as previously utilized for the cleaned container), and then the jacketed container holding the new frozen food composition can be transported to a consumer.

As noted above, some embodiments of the method 100 can omit one or more of the steps depicted in these figures, and some embodiments of the method 100 can include one or more additional steps. The depicted steps are preferably performed in the order in which they are illustrated (as shown by arrows), but some embodiments can perform the steps in a different order. Indeed, the present disclosure is not limited to the specific embodiment shown in FIGS. 1 and 2.

Another aspect of the present disclosure is a method of providing a frozen food composition directly to a consumer. The method comprises: providing a container; dispensing at least one comestible ingredient into the container; positioning a lid on the container containing the at least one comestible ingredient; freezing the container with the lid thereon and the at least one comestible ingredient therein to form the frozen food composition in the container, wherein at least one step is performed at a first location and is selected from the group consisting of (i) the dispensing of the at least one comestible ingredient, (ii) the positioning the lid on the container, and (iii) the freezing of the container; transporting the container with the frozen food composition therein from the first location to an intermediate location; attaching a jacket to at least one of (a) the container with the frozen food composition therein or (b) the lid on the container with the frozen food composition therein, the attaching of the jacket is performed at the intermediate location; and transporting the frozen food composition from the intermediate location to a home of the consumer by transporting the container in the jacket to the home of the consumer. An embodiment of this method can comprise one or more of Steps 102, 104, 106, 108, 112, 114, 116, 118, 120, 122 and 124 of the method 100 and optionally further steps as well.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of transporting one or more frozen food compositions, the method comprising:
providing a first container;
dispensing at least one comestible ingredient into the first container, the dispensing of the at least one comestible ingredient into the first container is performed at a first location;
positioning a first lid on the first container containing the at least one comestible ingredient;
freezing the first container with the first lid thereon and the at least one comestible ingredient therein to form a first frozen food composition in the first container;
transporting the first container with the first lid thereon and the first frozen food composition therein from the first location to an intermediate location;
attaching a first jacket to at least one of (a) the first container with the first frozen food composition therein or (b) the first lid on the first container with the first frozen food composition therein, wherein the attaching of the first jacket is performed at the intermediate location;
positioning the first jacket holding the first container in an insulated tote at the intermediate location;
transporting the first frozen food composition to a second location different than the first location by transporting the insulated tote containing the first container in the first jacket from the intermediate location to the second location;
cleaning the first container, the first lid, and the jacket after the first frozen food composition has been removed from the first container, the cleaning is performed at the intermediate location;
transporting the cleaned first container and the cleaned first lid to the first location while the cleaned jacket remains at the intermediate location;
dispensing a further comestible ingredient into the cleaned first container, the dispensing of the further comestible ingredient into the cleaned first container is performed at the first location;
positioning one of the cleaned first lid or a second lid on the cleaned first container containing the at least one comestible ingredient;
freezing the cleaned first container with the one of the cleaned first lid or the second lid thereon and the at least one comestible ingredient therein to form a second frozen food composition in the cleaned first container;
transporting the cleaned first container with the second frozen food composition therein and the one of the cleaned first lid or the second lid thereon to the intermediate location; and
then attaching, to the cleaned first container with the second frozen food composition therein at the intermediate location, one of a second jacket, or the first jacket after the first jacket has been removed and cleaned.

2. The method of claim 1, wherein each of the first and second frozen food compositions is a frozen confection.

3. The method of claim 1, wherein at least one of the first container, the first lid or the first jacket comprises an insulating material selected from the group consisting of a metal, a plastic, a ceramic, and combinations thereof.

4. The method of claim 1, wherein at least one of the first container or the first frozen food composition is substantially or completely enclosed by a combination of the first lid and the first jacket.

5. The method of claim 1, further comprising printing at least one of a batch code or an expiry date on the first lid at the first location after the first lid is applied to the first container.

6. The method of claim 1, wherein the transporting of the first container with the first frozen food composition therein from the first location to the intermediate location comprises loading one or more boxes on a pallet carried by a vehicle, each of the one or more boxes containing a plurality of frozen food compositions in a corresponding plurality of containers with a corresponding plurality of lids.

7. The method of claim 1, further comprising:
cleaning the first jacket after the first frozen food composition has been removed from the first container, and then attaching the cleaned first jacket, at the intermediate location, to one of (a) a second container, (b) a second lid on a second container, (c) a second lid on the first container after the first container has been removed and cleaned, (d) the first lid on a second container after the first lid has been removed and cleaned, and (e) the first lid on the first container after the first lid and the first container have been removed and cleaned.

8. The method of claim 1, further comprising positioning one or more additional containers in the insulated tote at the intermediate location, wherein the first frozen food composition and one or more additional frozen food compositions in the one or more additional containers are transported together to the second location in the insulated tote.

9. The method of claim 1, further comprising removing the first container holding the first frozen food composition from the insulated tote at the second location and then transporting at least one of the one or more additional frozen food compositions from the second location to a third location in the insulated tote.

10. A method of providing a frozen food composition directly to a consumer, the method comprising:
   providing a container;
   dispensing at least one comestible ingredient into the container;
   positioning a lid on the container containing the at least one comestible ingredient;
   freezing the container with the lid thereon and the at least one comestible ingredient therein to form the frozen food composition in the container, wherein the dispensing of the at least one comestible ingredient, the positioning the lid on the container, and the freezing of the container are performed at a first location;
   transporting the container with the frozen food composition therein from the first location to an intermediate location;
   attaching a jacket to at least one of (a) the container with the frozen food composition therein or (b) the lid on the container with the frozen food composition therein, the attaching of the jacket is performed at the intermediate location;
   positioning the jacket holding the container in an insulated tote at the intermediate location; and
   transporting the insulated tote, which contains the jacket holding the container with the frozen food composition therein, from the intermediate location to a home of the consumer;
   cleaning the container, the lid, and the jacket after the frozen food composition has been removed from the container, the cleaning is performed at the intermediate location; and
   transporting the cleaned container and the cleaned lid to the first location while the cleaned jacket remains at the intermediate location.

11. The method of claim 10, further comprising positioning one or more additional containers in the insulated tote at the intermediate location, wherein the frozen food composition and one or more additional frozen food compositions in the one or more additional containers are transported together to the home of the consumer in the insulated tote.

* * * * *